March 6, 1951  G. W. CONCKLIN  2,544,220
SHOPPING CARRIER FOR STORES
Filed July 23, 1946  2 Sheets-Sheet 1
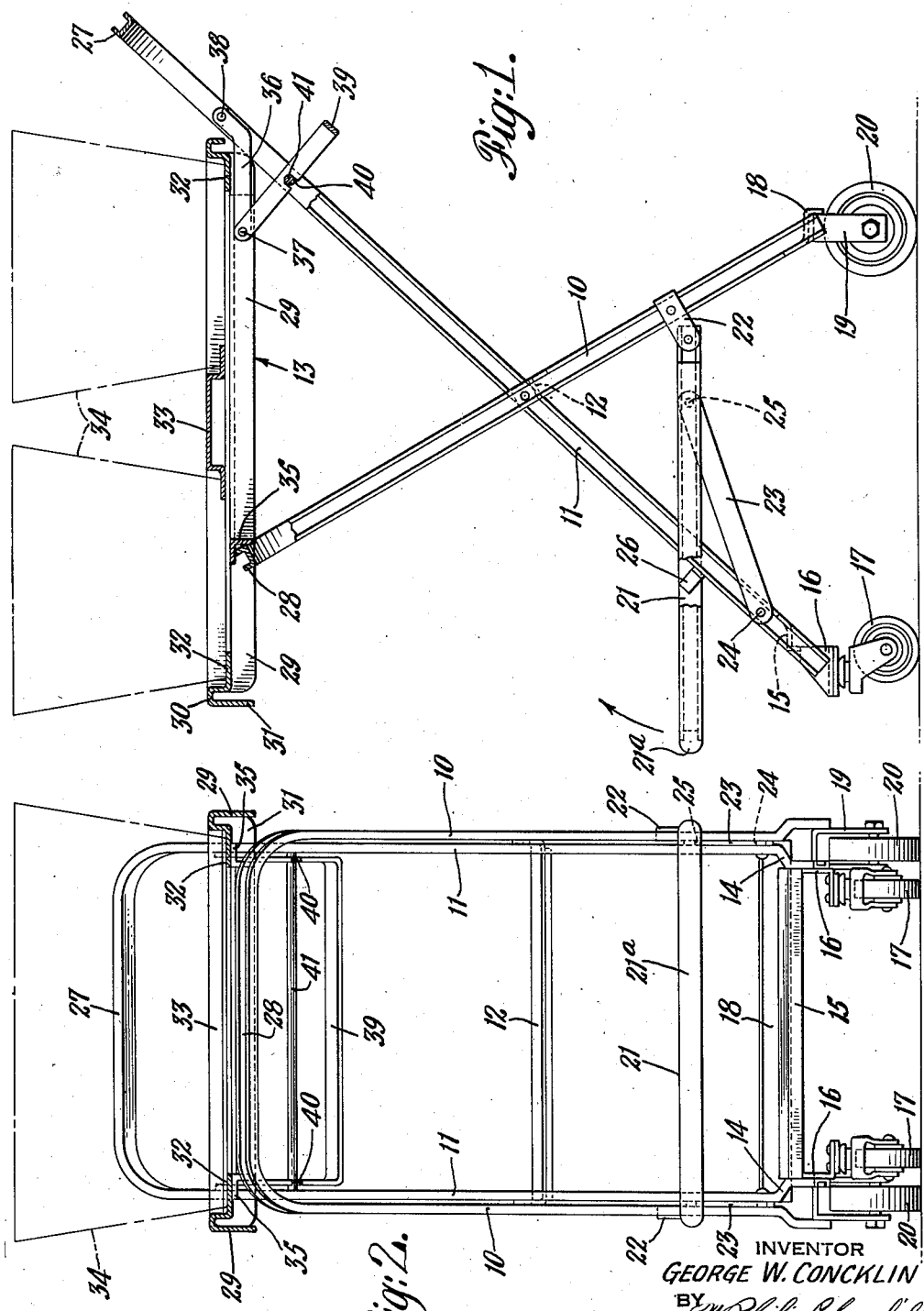
INVENTOR
GEORGE W. CONCKLIN
BY W. Philip Churchill
ATTORNEY March 6, 1951 G. W. CONCKLIN 2,544,220
SHOPPING CARRIER FOR STORES
Filed July 23, 1946 2 Sheets-Sheet 2
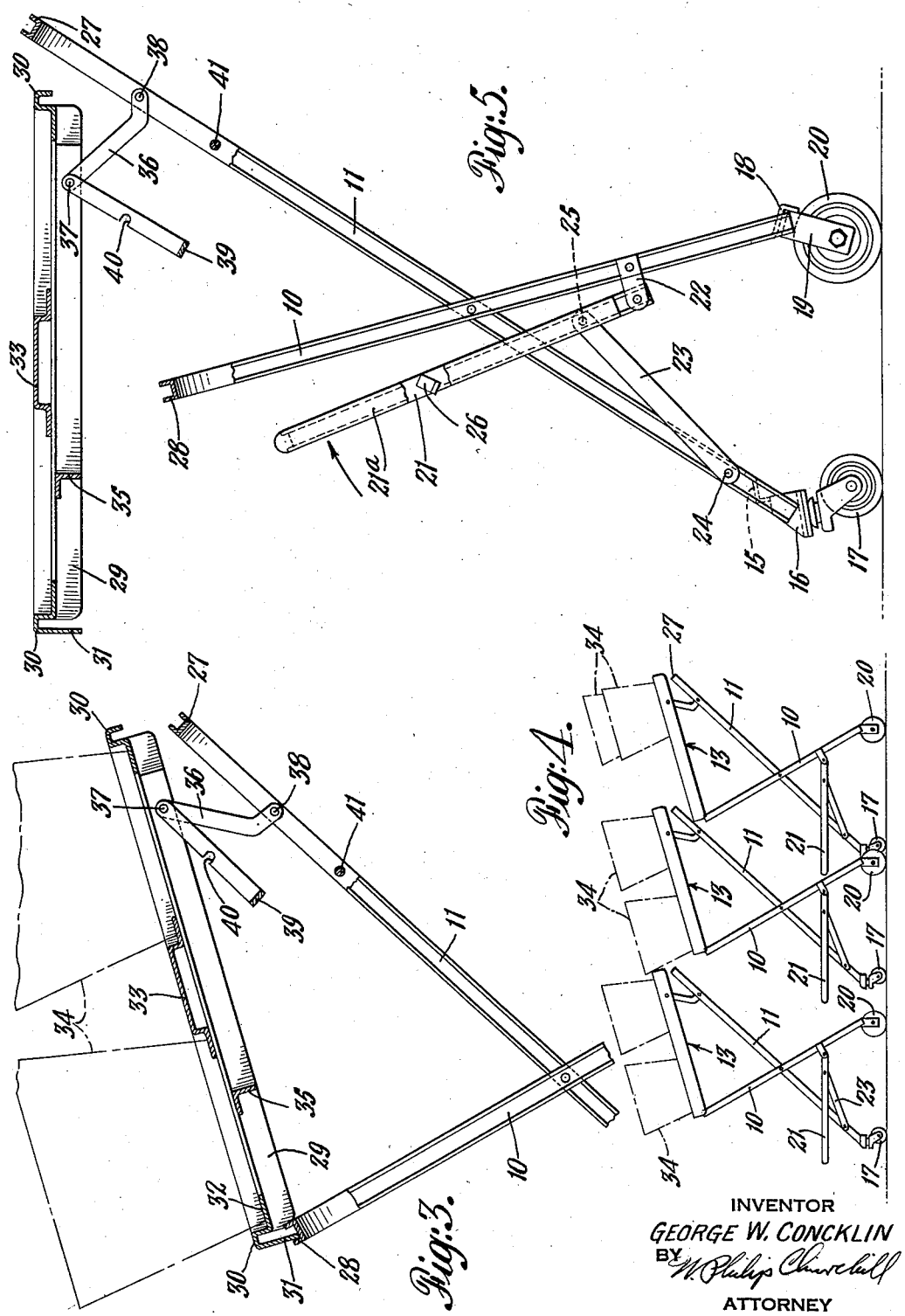
INVENTOR
GEORGE W. CONCKLIN
BY
ATTORNEY Patented Mar. 6, 1951

2,544,220

UNITED STATES PATENT OFFICE 2,544,220

SHOPPING CARRIER FOR STORES

George W. Concklin, Suffern, N. Y., assignor to John Chatillon & Sons, New York, N. Y., a corporation of New York Application July 23, 1946, Serial No. 685,730

4 Claims. (Cl. 280—36)

This invention relates to an improved cart or carrier that is particularly useful as a support for baskets or boxes used by customers in self service stores.

Carriers of this type should be constructed so that they are light in weight, sturdy and rigid when used by a customer, tall enough for convenience of the customer, and constructed so that when not in use they may be parked compactly together in a small space. While not essential, it is also desirable that such carriers be collapsible so that they may be readily shipped or packed away when they are not needed or when they are moved from one store to another.

One object of my invention is to provide a carrier that meets the foregoing requirements, that provides a support for one or more large shopping baskets or boxes on the upper section of the carrier, and that has a member serving to lock the frame in open position and also as a bumper for the carrier.

Another object is to provide such a carrier with a basket supporting tray that can be tilted so that a number of said carriers can be parked together in a relatively small space.

Another object of this invention is to provide a carrier meeting the foregoing requirements having a tray that is very easy and simple to adjust from the tilted parked position to a locked substantially horizontal operating position.

Other objects and advantages will be mentioned and will be apparent from the foregoing description of one embodiment of this invention illustrated in the accompanying drawings, in which Fig. 1 is a side elevation view, partly in section, of a carrier constructed in accordance with my invention, and in position to be used by a customer in a store.

Fig. 2 is a front elevation view, partly in section of the carrier shown in Fig. 1.

Fig. 3 is a side elevation view, partly in section, of the upper portion of the carrier with the basket supporting tray tilted to permit nested parking of a group of the carriers.

Fig. 4 is a somewhat diagrammatic view of three of the carriers shown in Fig. 1, and illustrating two different methods of parking the carriers.

Fig. 5 is a side elevation view, partly in section, of the carrier in partially collapsed position.

The carrier illustrated has a frame made up of two U-shaped members 10 and 11 providing crossed pairs of legs pivotally connected together by means of the cross bar 12. Thus, the lower portions of the frame members 10 and 11, extending down below the pivotal connection, serve as legs for the carrier, and the upper portions above the pivotal connection form extensions that support a tray 13. The lowermost ends of the frame member 11 are preferably offset inwardly, as indicated at 14, and connected together for added strength and rigidity by a cross bar 15. Brackets 16 may be welded or otherwise fixed to the cross bar 15 so that the casters 17 may be mounted in them. The lower ends of the frame member 10 are preferably connected by a cross bar 18 with brackets 19 attached to these lower ends to hold the wheels 20. As the carrier is pushed along, the rear wheels 20 remain fixed and steering is accomplished by swiveling of the casters 17.

In order to maintain the lower portions of the frame members 10 and 11 in properly spaced relation during ordinary operation of the carrier, the ends of a U-shaped member 21, which serves as a combination lock for the frame and bumper for the carrier, may be pivotally attached to the brackets 22, welded or otherwise fixed to the legs of frame member 10 between the connecting bar 12 and the wheels 20. The locking member 21 is also preferably conencted to the legs of the frame member 11 by the links 23, which are pivotally attached to the outside of legs of frame member 11 at 24 and are pivotally attached to the inside of locking frame 21 at 25. Feet or stops 26 may be welded or otherwise secured to the sides of the locking frame 21 so that they rest on the lower portions of the frame member 11 when the locking frame is in its lowermost position. The frame member 21 operates somewhat like a toggle, although it is preferably constructed so that the pivot points 25 never drop down to or below an imaginary line connecting the pivots 24 with the brackets 22. Thus, the weight of the handle portion of the member 21 normally holds the legs of the carrier rigidly apart in proper position to avoid any accidental collapsing, but the member 21 can be readily lifted to operate as a lever, pulling the legs together when it is desired to collapse the frame of a carrier. As seen in Fig. 2, the member 21 surrounds the frame 11 and may be formed with a rubber facing 21a to provide a bumper that protects store fixtures and the like.

The upper portion of the frame member 11, which is really the base of the U, provides a convenient handle 27 for pushing and steering the carrier. This upper portion of the frame member 11 preferably extends well above the upper portion 28 of the frame member 10.

The tray 13 may be of any suitable construction, but in the form illustrated is composed of side members 29, and the end sections 30 welded or otherwise secured together to form a rectangular tray. These side and end members may be made from suitable sheet material bent to form a depending flange 31 and an inwardly projecting shelf 32 that extend around the entire tray. If desired, the sides 29 of the tray may be connected at their center by a channel shaped member 33 serving as a partition in order to provide separate spaces for two of the baskets 34 on the same tray. The side members 29 are also preferably connected near one end by a section of angle iron 35.

The outer end of the tray 13 thus may simply rest in sliding engagement on the upper portion 28 of the frame member 10. The other end of the tray is preferably connected by the links 36 pivotally attached as at 37 to the sides of the tray and also pivotally connected as at 38 to the upper portion of the frame member 11. When the tray is in a normal horizontal position, the links 36 provide a rigid support for one end of the tray and the other end simply rests with the top section 28 of frame member 10 bearing against the angle iron 35. In order to lock the tray securely in this position, a locking handle 39 of generally U-shape may have its ends pivotally connected at the points 37 to the tray and the links 36. Notches 40 in the sides of this locking handle are adapted to engage the cross rod 41 fixed to frame member 11 to lock the tray in place.

When it is desired to park a group of these carriers together, the locking handle 39 may be easily lifted to disengage the notches 40 from the rod 41, and a simple inward and upward push against the locking handle 39 lifts the back end of the tray up into a tilted position, the tray sliding back on the upper section 28 of the frame 10. In order to hold the tray in this tilted position, the flange 31 of the front end piece 30 may be lifted and seated in a groove in the upper portion 28 of the frame 10, as shown in Fig. 3. A number of the carriers can then be pushed together very compactly, as shown in Fig. 4, either by leaving the two baskets side by side on the tray, or by nesting the baskets together near the back end of the tray as illustrated in Fig. 4.

If it is desired to collapse the frame completely, as when extra carriers are to be packed away for some reason, or when the carriers are packed for shipment or moving, this may be done very simply by lifting the free end of the tray with one hand and raising the handle of the locking frame 21 with the other hand. As the handle of locking frame 21 is lifted, the frame members 10 and 11 swing about the pivoting rod 12 and are moved into approximately the same plane with each other. The tray 13 may then be dropped down on top of the collapsed frame to provide a compact folded structure.

It will be apparent that this carrier may be very readily and easily moved from the tilted position used for parking to adjust the tray to the horizontal position used for shopping. This movement or adjustment of the tray does not change the frame, and the frame by reason of the weight of the locking member 21 remains rigid during any such manipulation of the tray, thus preventing any accidental collapse of the carrier. Once the locking handle 39 is adjusted so that the notches 40 engage the rod 41, the tray is rigidly secured in place and is supported by the frame in such a manner that the baskets do not slide around and the frame is not apt to tip or collapse, even though one or both of the baskets may be loaded unevenly as the shopper progresses around the store.

The frame members 10 and 11 are illustrated as each made from a single piece of channel stock which, of course, adds to the simplicity of the structure as well as provides adequate strength for the frame. Furthermore, the use of channel stock provides a groove on the upper section 28 of the frame member 10 for holding the flange 31 at one end of the tray 13 when it is in tilted position for parking. It will be apparent, however, that the tray may be constructed if desired to handle one large basket instead of the two nesting baskets illustrated.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A carrier comprising a frame having crossed pairs of legs pivotally connected together, wheels on the lower ends of said legs, a tray pivotally attached at one end by links to the upper portion of one of said pairs of legs and resting in sliding engagement on the upper portion of the other of said pairs of legs, and handle means connected to the first mentioned end of said tray for tilting the tray into an inclined position and for locking the tray in a substantially horizontal position.

2. A carrier comprising a frame having crossed pairs of legs pivotally connected together, wheels on the lower ends of said legs, a tray pivotally attached at one end by links to the upper portion of one of said pairs of legs and resting in sliding engagement on the upper portion of the other of said pairs of legs, and means for locking the lower portions of said legs in spaced relation to each other to form a rigid frame, said means having a handle that can be lifted to unlock the frame and pivot the pairs of legs into collapsed position, said tray being adjustable independently of and without any movement of said locking means.

3. A carrier comprising a frame having crossed pairs of legs pivotally connected together, wheels on the lower ends of said legs, a tray pivotally attached at one end by links to the upper portion of one of said pairs of legs and resting in sliding engagement on and overhanging the upper portion of the other of said pairs of legs, and handle means for locking said tray in substantially horizontal position and for lifting said attached end of the tray into an inclined position with the free end thereof retracted, said free end having a depending flange to engage a recess on the upper portion of the legs supporting it when the tray is in inclined position.

4. A carrier comprising a frame having crossed pairs of legs pivotally connected together, wheels on the lower ends of said legs, means connecting the lower portions of said legs for locking them in spaced relation to each other, said means being capable of being readily lifted to unlock the frame and move the legs into substantially the same plane, a tray pivotally attached at one end by links to the upper portion of one of said pairs of legs and resting in sliding engagement on and overhanging the upper portion of the other of said pairs of legs, and handle means for locking said tray in substantially horizontal position and for lifting said attached end of the tray into an inclined position with the free end thereof retracted, said free end having a depending flange to engage a recess on the upper portion of the legs supporting it when the tray is in inclined position.

GEORGE W. CONCKLIN.

REFERENCES CITED

The following references are of record in the file of this patent:

UNITED STATES PATENTS

| Number | Name | Date |
|---|---|---|
| 1,664,130 | Rae | Mar. 27, 1928 |
| 2,155,896 | Goldman | Apr. 25, 1939 |
| 2,196,914 | Goldman | Apr. 9, 1940 |
| 2,234,358 | Schray | Mar. 11, 1941 |
| 2,378,931 | Kiesow | June 26, 1945 |
| 2,397,317 | Hulburt et al. | Mar. 26, 1946 |
| 2,407,385 | Rubin et al. | Sept. 10, 1946 |
| 2,414,943 | Gray | Jan. 28, 1947 |
| 2,429,034 | Smith et al. | Oct. 14, 1947 |